US007937550B2

(12) United States Patent
Morita et al.

(10) Patent No.: US 7,937,550 B2
(45) Date of Patent: May 3, 2011

(54) DATA RECORDING DEVICE, DATA RECORDING METHOD, AND RECORDING MEDIUM

(75) Inventors: Toru Morita, Tokyo (JP); Shunsuke Kunieda, Tokyo (JP); Shigeru Enomoto, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 647 days.

(21) Appl. No.: 11/630,722

(22) PCT Filed: Jun. 16, 2005

(86) PCT No.: PCT/JP2005/011033
§ 371 (c)(1),
(2), (4) Date: Apr. 6, 2007

(87) PCT Pub. No.: WO2006/001213
PCT Pub. Date: Jan. 5, 2006

(65) Prior Publication Data
US 2007/0285820 A1 Dec. 13, 2007

(30) Foreign Application Priority Data
Jun. 25, 2004 (JP) ................................. 2004-188710

(51) Int. Cl.
*G06F 12/00* (2006.01)
*G06F 13/00* (2006.01)
*G06F 13/28* (2006.01)
*G06F 7/00* (2006.01)
*G06F 17/00* (2006.01)

(52) U.S. Cl. .......................... 711/170; 711/154; 707/693

(58) Field of Classification Search .................. 711/170, 711/154; 707/693
See application file for complete search history.

(56) References Cited

U.S. PATENT DOCUMENTS

| 6,195,462 | B1 | 2/2001 | Bryniarski et al. |
| 6,976,026 | B1 * | 12/2005 | Getzinger et al. ............. 707/101 |
| 2002/0025076 | A1 * | 2/2002 | Yamada ......................... 382/233 |
| 2002/0097911 | A1 * | 7/2002 | L. de Queiroz ............... 382/195 |
| 2003/0016755 | A1 * | 1/2003 | Tahara et al. ............. 375/240.25 |
| 2003/0154344 | A1 | 8/2003 | Itoi |

FOREIGN PATENT DOCUMENTS

| JP | 10-262179 | 9/1998 |
| JP | 10-271498 A | 10/1998 |
| JP | 2002-271744 | 9/2002 |
| JP | 2004-21754 A | 1/2004 |

OTHER PUBLICATIONS

Notice of Rejection dated Jan. 17, 2006, from the corresponding Japanese Application.
Pioneer DVD Recorder Catalog, Mar. 2004, Pioneer Corporation.
Australian Examination Report dated May 12, 2008, from the corresponding Australian Application.
International Search Report dated Aug. 16, 2005 for corresponding application PCT/JP2005/011033.
Chinese Office Action dated Jun. 23, 2010, from the corresponding Chinese Application.

\* cited by examiner

*Primary Examiner* — Kevin L Ellis
*Assistant Examiner* — Ryan Bertram
(74) *Attorney, Agent, or Firm* — Katten Muchin Rosenman LLP

(57) ABSTRACT

A motion image processing device for producing a representative static image based on motion image data recorded on a recording medium, comprising;
acquiring image acquiring position information for specifying an image acquiring position in the motion image data,
acquiring a reproduced image in the image acquiring position specified by the acquired image acquiring position information from the motion image data as a representative static image, and
storing the acquired image acquiring position information on the recording medium so as to be associated with the information specifying the motion image data.

8 Claims, 2 Drawing Sheets

| RECORDING OBJECT DATA | COMPRESSION METHOD | CHANGE FLAG |
|---|---|---|
| aaaa | LP | 0 |
| bbbb | LP | 1 |
| ⋮ | ⋮ | ⋮ |

DATA RECORDING DEVICE, DATA RECORDING METHOD, AND RECORDING MEDIUM

This application is a National Phase Application of International Application No. PCT/JP2005/011033, filed Jun. 16, 2005, which claims the benefit under 35 U.S.C. 119 (a-e) of JP 2004-188710 filed Jun. 25, 2004, which is herein incorporated by reference.

TECHNICAL FIELD

The present invention relates to a data recording device, a data recording method, and a program, for recording data on a recording medium, such as a DVD-RW, or the like, which has a storage area of limited capacity.

BACKGROUND ART

In general, in an attempt to store data of large size, such as motion image data, onto a recording medium such as a DVD (Digital Versatile Disk)-RW, storage of data utilizing information compression processing, rather than storage of data intact, is widely employed. With respect to motion image data, for example, a variety of compression methods defined by a group of standards called MPEG (Motion Picture Experts Group) are utilized.

Here, as a method for compressing motion image data for use in storing the data onto a DVD-RW, a plurality of compression methods having compression efficiencies differing in a stepwise manner are available. That is, compression efficiency at a level appropriate for the purpose is selected from compression efficiencies at a plurality of levels, such as HQ (high image quality), HSP (image quality priority), SP (standard), LP (time priority), EP (long time), SLP (extra long time), and so forth, and a compression process is carried out with the compression efficiency at the selected level.

Here, some of the recording media, such as a DVD-RW, or the like, have limited storage capacities, and recording thereon of data of an amount in excess of this limit is not achievable. For example, in an attempt to record a plurality of motion image data on a single DVD-RW, motion image data with a total size in excess of about 4.7 G bytes cannot be recorded all together.

However, an arrangement for enhancing the compression efficiency relative to a part of the data makes it possible to adjust the data to be of a size that allows all of the data to be stored. That is, by recompressing a part of the motion image data using a time priority mode that slightly sacrifices the image quality thereof, the size of the motion image data is reduced.

Employment of such an arrangement is not limited to a DVD-RW, and the arrangement is similarly applicable to a DVD-R, a DVD+RW, or the like, for recording motion image data, and further to a CD-R for recording not only motion image data but also music data, and still further to various recording media for recording general data.

One example of a typical DVD recorder employing a stepwise compression method is disclosed in the Non-Patent Document 1.

[Non-Patent Document 1] Pioneer Cooperation, DVD recorder catalogue, March, 2004

However, a conventional data recording device requires the user himself/herself to recompress the data to thereby adjust the data size, which is inconvenient. Thus, practically; it is often the case that an easier solution of recording the data separately on two recoding media is employed even though the data could be recorded on a single recording medium by using a different compression method.

The present invention has been conceived in view of the above described situation, and one of the objects of the present invention is to provide a data recording device, a data recording method, and a program, all capable of enhancing convenience relevant to data size adjustment.

DISCLOSURE OF THE INVENTION

In order to address the problem of the above-described related art, according to the present invention, a data recording device is provided for recording a plurality of recording object data on a recording medium having a storage area of a predetermined capacity, comprising an estimated volume calculation portion for calculating an estimated value of the total volume of the plurality of recording object data, which will result when the plurality of recording object data is recorded on the recording medium, a recompression candidate selection portion for selecting, when the estimated value calculated is in excess of the predetermined capacity, at least one of the plurality of recording object data as a recompression candidate, and a recompression portion for changing the compression method for the recording object data selected as the recompression candidate and for compressing the recording object data selected using a method with higher compression efficiency.

BEST MODE FOR CARRYING OUT THE INVENTION

Figure 1:
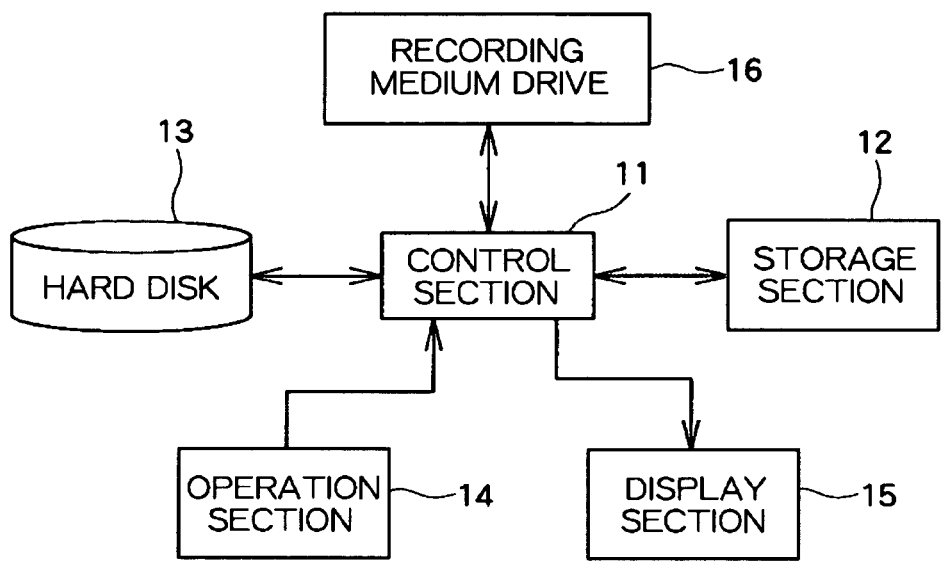
FIG. 1 is a structural block diagram showing an example of a data recording device according to an embodiment of the present invention.

An embodiment of the present invention will be described in reference to the accompanying figures. As shown in FIG. 1, the data recording device in this embodiment is constructed comprising a control section 11, a storage section 12, a hard disk 13, an operation section 14, a display section 15, and a recording medium drive 16.

The control section 11 is realized using an MPU (Micro Processing Unit) or the like. The control section 11 operates according to a program stored in the storage section 12, and carries out a process of recording a plurality of recording object data on a recording medium having a storage area of a predetermined capacity.

In the above, the control section 11 calculates an estimated value of the total volume of the plurality of recording object data, which will result when the plurality of recording object data is recorded on the recording medium. When the estimated value is in excess of the capacity of the recording medium, the control section 11 selects at least one of the recording object data as a recompression candidate, and changes the compression method for the recording object data selected as a recompression candidate so that the recording object data selected as a recompression candidate is compressed again using a compression method having higher compression efficiency. Specific contents of these processes will be described later in detail. It should be noted here that rewritable recording media, such as DVD-RW, DVD+RW, or the like, relevant to DVD techniques are collectively referred to as "DVD."

The storage section 12 is constructed comprising a memory element, such as a RAM (Random Access Memory), a ROM (Read Only Memory), or the like, and a program to be executed by the control section 11 is stored in the storage section 12. The program may be stored in a computer readable recording medium such as a CD-ROM, a DVD-ROM, or the like. In this case, the recording medium drive 16 reads the program, and copies onto the hard disk 13. Then, at the time of execution, the control section 11 reads the program from the hard disk 13 and copies into the storage section 12, so that the copied program in the storage section 12 is read for use in execution. The storage section 12 functions also as a work memory for temporarily holding a variety of data produced in the process by the control section 11. The hard disk 13 is a recording medium for holding motion image data, or the like, accumulated therein.

The operation section 14, which may be a keyboard, a mouse, a game controller, a button, a remote controller, or the like, receives an instruction operation carried out by the user and outputs the content of that instruction operation to the control section 11. According to the instruction input from the control section 11, the display section 15, which is constructed comprising a display controller, or the like, outputs a video signal based on image data to an external display, television, or the like. Alternatively, the display section 15 may comprise a light emitting device such as an LED, and turn the light emitting device on or off based on a signal input from the respective sections including the control section 11, the hard disk 13, and so forth.

The recording medium drive 16 accepts a recording medium having a storage area of a predetermined capacity, such as a CD-R, a DVD, Blu-ray Disc (trademark) or the like, for example, and, according to the instruction input from the control section 11, writes information onto the recording medium or reads information from the recording medium to output to the control section 11. It should be noted that although the hard disk 13 is one recording medium, in the following, for the purpose of explanation, the medium set in the recording medium drive 16 is referred to as a "recording medium," and the hard disk 13 is referred to intact as a "hard disk."

Figure 2:
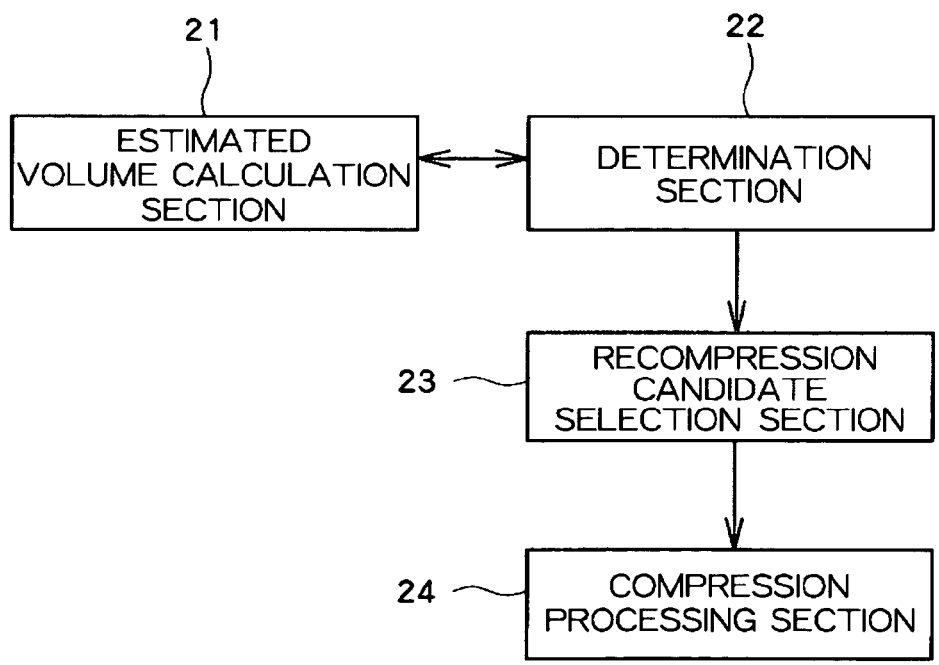
FIG. 2 is a functional block diagram showing an example of the data recording device according to the embodiment of the present invention.

In the following, the specifics regarding the process to be carried out by the control section 11 will be described. It should be noted that, in the following, a case in which a part of the plurality of data for processing (assumed here as motion image data) stored on the hard disk 13 is copied to and stored on a recording medium such as a DVD-RW, or the like, is described as an example. The program to be executed by the control section 11 is constructed comprising, as shown in FIG. 2 and in terms of function, an estimated volume calculation section 21, a determination section 22, a recompression candidate selection section 23, and a compression processing section 24.

The control section 11, according to an instruction operation carried out by the user, stores information for specifying each of the motion image data (that is, recording object data) for copying in the storage section 12 serving as a work memory. Here, the information for specifying the motion image data may be, for example, the name of a file containing motion image data, or the like.

Figures 3, 4:
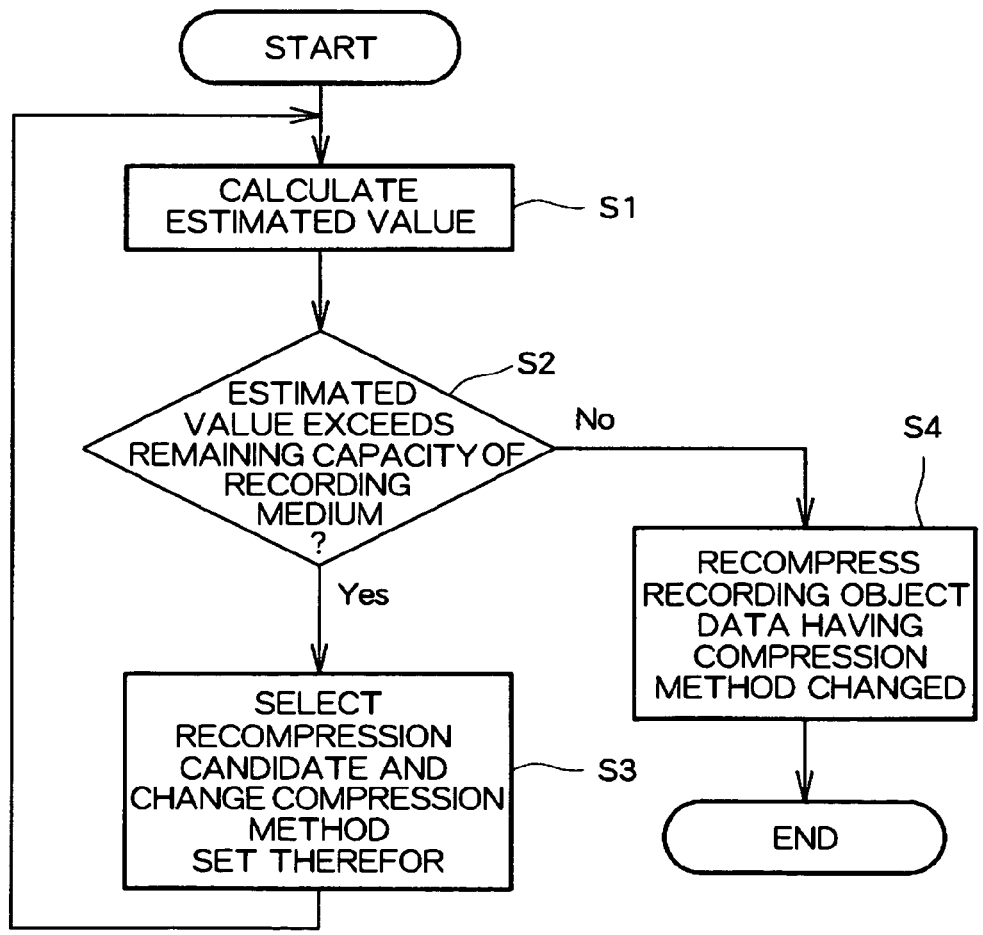
FIG. 3 is a diagram explaining one example of a compression setting table.
FIG. 4 is a flowchart of an example of an operation of the data recording device according to the embodiment of the present invention.

Also, the control section 11 stores a compression setting table in the storage section 12, in which the compression setting table comprises information describing the recording object data specified by the user (for example, the file name of the recording object data), a compression method set for the recording object, and a change flag telling whether or not the setting of the relevant compression method has been changed since the time of initiation, all held therein so as to be associated with one another (FIG. 3). At the time of initialization, the compression method specified by the user (the state in which the concerned data is stored on the hard disk 13) may be set for the relevant recording object data. It should be noted that, in FIG. 3, the change flag is set as "0" for the case in which the setting of the compression method has not been changed since the time of initialization, and the change flag is set as "1" for the case in which the setting has been changed.

Upon completion by the user of the specifications of the recording object data or upon receipt of an instruction requesting calculation of an estimation value, sent from the determination section 22, the control section 11 controls so as to begin a process using the estimated volume calculation section 21 to calculate, while referring to the compression setting table stored in the storage section 12, the total estimated value of the estimated size of the recording object data, which will result when the recording object data is stored on the recording medium. As for recording object data being motion image data, for example, the estimated value is calculated, for example, based on the period of time necessary to reproduce the entire motion image data and the average compression efficiency (the value may be stored in advance in the storage section 12) of the compression method specified with respect to the motion image data.

The determination section 22 determines whether or not the estimated value calculated by the estimated volume calculation section 21 exceeds the capacity of the recording medium. When it is determined that the estimated value is in excess of the remaining capacity of the recording medium (a predetermined capacity referred to in the present invention), the determination section 22 instructs the recompression candidate selection section 23 to select a recompression candidate. Then, the compression method set for the selected recompression candidate is changed, and the compression setting table stored in the storage section 12 is updated accordingly. Thereafter, an instruction is sent to the estimated volume calculation section 21, requesting recalculation of the estimated value.

Meanwhile, when it is determined that the estimated value is not in excess of the capacity of the recording medium and when there is at least one recording object data having a compression method set thereof such that it has been changed, which is known by referring to the change flag in the compression setting table, the determination section 22 instructs the compression processing section 24 to compress the respective recording object data based on the setting defined in the compression setting table stored in the storage section 12. Meanwhile, when none of the compression methods set for the respective object data are changed, it is then determined whether it is possible to record the entire recording object data onto a single recording medium using the currently set compression method, and the results of the determination are output.

Having received the instruction from the determination section 22, requesting selection of a recompression candidate, the recompression candidate selection section 23 selects at least one of the recording object data as a recompression candidate following a predetermined selection rule. Then, the recompression candidate selection section 23 updates the compression setting table so as to change the compression method set for the selected recompression candidate.

As described above, the motion image data has been compressed with the compression efficiency at a level suitable for the purpose of the data and selected from the compression efficiencies at a plurality of levels including steps HQ (high image quality), HSP (image quality priority), SP (standard), LP (time priority), EP (long time), SLP (extra long time), or the like. Therefore, in this embodiment, the level of the compression efficiency set for the selected recording object data, for example, is enhanced by one.

Here, specifically, the above-described selection rule can be defined such that the sizes of the respective recording object data are determined and that the recording object data of the largest object data is selected as a recompression candidate. The recompression candidate selection section 23 updates the compression setting table based on the results of the selection.

The compression processing section 24 compresses the respective recording object data while referring to the compression setting table. Specifically, while referring to the change flag in the compression setting table, the compression processing section 24 finds recording object data having a compression method set thereof such that it has been changed from that at the time of initialization (recording object data selected as a recompression candidate). Then, the recording object data selected as a recompression candidate is compressed using the compression method defined in the compression setting table.

Specifically, suppose that the motion image data which is the recording object data selected as a recompression candidate is compressed with compression efficiency SP and the compression method set for this motion data in the compression setting table is LP. In this case, the motion image data is recompressed using a compression method with compression efficiency LP. This recompression method is a process widely known as "rate conversion," with a detailed description thereof omitted here. Upon completion of the recompression processing of the recording object data selected as a recompression candidate, the compression processing section 24 outputs the information telling that the recompression processing is completed.

It should be noted that, although a case in which the recording object data is motion image data is described in the above, general data may also be able to be recompressed with enhanced compression efficiency using the following method. That is, the recording object data selected as a recompression candidate is extracted (extraction), and the data obtained by extracting (extraction) is compressed using a compression method having higher compression efficiency.

In the following, the operation of the data recording device in this embodiment will be described.

In the example below, a case in which a part of the plurality of motion image data stored on the hard disk 13 is copied to, and stored on, a recording medium such as a DVD-RW, or the like, will be described as an example. The control section 11 receives an instruction operation carried out by the user for specifying a part of the plurality of motion image data stored on the hard disk 13, as an object for recording. Then, a list of the file names of the motion image data which are objects for recording is stored in the storage section 12.

Then, the control section 11 begins the process shown in FIG. 4 to calculate an estimated value of the total estimated size (total volume) of the respective recording object data specified by the file names stored in the storage section 12, which will result when the recording object data is compressed using the respective compression methods set therefor and stored on a recording medium (calculation process of an estimated value: S1).

Thereafter, the control section 11 determines whether or not the estimated value calculated in process S1 is in excess of the remaining capacity of the recording medium (S2). Then, when it is determined that the estimated value is in excess of the remaining capacity of the recording medium (Yes), the control section 11 selects the recording object data of the largest data size (the size of the data when stored on the recording medium) as a recompression candidate from among the recording object data (S3), and changes the compression method set for the recording object data before returning to process S1 to continue processing.

Meanwhile, when it is determined in process S2 that the estimated value is smaller than the remaining capacity of the recording medium (No), the control section 11 recompresses the recording object data having a compression method set thereof such that it has been changed and selected as a recompression candidate, using the compression method after the change (S4) before terminating processing. With the above, the recording object data selected as a recompression candidate is recompressed using a compression method with higher compression efficiency.

Subsequent to this process, the control section 11 may copy each of the specified recording object data onto the recording medium to record therein.

With the above processing, the estimated values relevant to the data of the largest data size are calculated, which will result when the data of the largest data size is recompressed with the respective compression efficiencies enhanced in a stepwise manner such as from SP to LP or from LP to EP, for example, until the estimated value, which is accordingly reduced in a recursion manner, reaches a value which allows determination of whether or not the concerned data can be stored on a recording medium.

It should be noted that, although the data of the largest data size is solely selected as a recompression candidate in the above, alternatively, a plurality of recording object data may be selected as recompression candidates, sequentially in descending order of the data size.

In the case where single execution of recompression processing is not enough to reduce the data size to be small enough to allow storage of all data on a single recording medium, at least one data set may be selected as a recompression candidate, sequentially in descending order of the pre-recompression data size. In this arrangement, mostly, data of large original sizes are repeatedly compressed.

It should be noted that the method for selecting a recompression candidate is not limited to those described above. For example, although data size is focused on in selection of a recompression candidate in the above, compression efficiency may be focused on instead, and at least one data set may be selected as a recompression candidate, sequentially in ascending order of the compression efficiency relevant to the compression aspect of the recording object data, from among the respective recording object data.

That is, where compression efficiency for motion image data becomes higher here in the order of HQ (high image quality), HSP (image quality priority), SP (standard), LP (time priority), EP (long time), SLP (extra long time), in the case in which there is recording object data to be recorded with HQ and other data to be recorded with SP, the data to be recorded with HQ is recompressed with higher compression efficiency, specifically, HSP, for example. In the case where there is a plurality of recording object data which is compressed using a compression method with the lowest compression efficiency, the recording object data is selected as a recompression candidate, while focusing on the data size, in order of the largest data size.

Here, as recompression processing generally undertakes a high load, it is preferable that the application of recompression processing be avoided if possible. Therefore, an estimated value of the total volume of recording object data after recompression processing may be calculated for each of the combinations of data, which are available in selecting a recompression candidate. Then, a combination including the smallest number of recording object data selected as a recompression candidate is found among the combinations each resulting in an estimated value of the total volume after recompression, smaller than the empty capacity of the recording medium.

Specifically, in this process, the control section 11 initially lists the combinations available during the selection of a recompression candidate from among the recording object data.

For example, in the case where there are three motion image data A, B, and C, the following combinations are available:
(1) selecting A as a recompression candidate;
(2) selecting B as a recompression candidate;
(3) selecting C as a recompression candidate;
(4) selecting A and B as recompression candidates;
(5) selecting A and C as recompression candidates;
(6) selecting B and C as recompression candidates; and
(7) selecting A, B, and C as recompression candidates.

A process for listing these combinations can be carried out using a recursive process, as is widely known.

Thereafter, the control section 11 calculates an estimated value of the total volume of the recording object data, which will result when the motion image data selected as a recompression candidate data in each of the combinations is recompressed with higher compression efficiency. In this example, in which motion image data is referred to, the estimated value of the total volume which results when the compression efficiency is enhanced by one level may be calculated. Then, it is determined whether or not there is any combination that will result in an estimated value smaller than the empty capacity of the recording medium.

Suppose here that the combinations of (3) selecting C as a recompression candidate, (5) selecting A and C as recompression candidates, (6) selecting B and C as recompression candidates, and (7) selecting A, B, and C as recompression candidate, result in an estimated value of the total volume smaller than the empty capacity of the recording medium. In this case, a combination including only one recompression candidate, namely, combination (3) selecting C as a recompression candidate, is found, and the control section 11 selects the motion image data C as a recompression candidate. In the above example, the number of recording object data selected as recompression candidates is used intact as a score, and a recompression candidate is selected based on the combination having the smallest score.

Here, combinations to be listed may include combinations prepared using different amounts of variation.

That is, for example, suppose that there exists motion image data A recorded with compression efficiency HQ and motion image data B and C recorded with compression efficiency SP. When (1) the motion image data A is selected as a recompression candidate, there are a plurality of combinations available, including one in which the motion image data A is recompressed with compression efficiency HSP, another in which the motion image data A is recompressed with compression efficiency SP, still another in which the motion image data A is to be recompressed with compression efficiency LP, and so forth.

Likewise, when (4) the motion image data A and B are selected as recompression candidates, there are a plurality of combinations available, including one in which the motion image data A is recompressed with compression efficiency HSP and the motion image data B is recompressed with compression efficiency LP, another in which the motion image data A is recompressed with compression efficiency SP and the motion image data B is recompressed with compression efficiency LP, and so forth. As described above, there are many combinations available.

However, varying the compression efficiency by a larger amount, such as, recompressing the motion image data compressed with compression efficiency with HQ (high image quality), with compression efficiency SLP (extra long time), may result in significant deterioration in image quality. Therefore, the control section 11 controls so as to ensure a smaller possible amount of variation in the compression efficiency. Specifically, when the compression efficiency is defined in a stepwise manner, the amount of variation in the compression efficiency can be regarded as a difference in levels of recompression. That is, in the case where the levels of compression efficiency are defined as HQ (high image quality), HSP (image quality priority), SP (standard), LP (time priority), and so forth, data recompression from compression efficiency HQ to compression efficiency HSP is determined as "1", and that from HQ to SP is determined as "2".

Alternatively, the amount of variation in the compression efficiency can also be regarded as the amount of change in data size. For example, in the case where the data size before recompression is S0 and that after recompression is S1, the amount of change in the compression efficiency may be defined as |S0−S1| in which |·| denotes calculation of an absolute value.

That is, the control section 11 calculates a score, as for each of the listed combinations, associated with the number of recording object data and the amount of variation in the compression efficiency. Specifically, the score σ may be calculated as:

$$\sigma = \mu 1 \cdot N + \mu 2 \cdot \Sigma Di$$

wherein N is the number of recording object data selected as recompression candidates, and Di is the amount of variation in the compression efficiency for the recording object data which is the $i^{th}$ recompression candidate. As ΣDi, the sum of the amounts of variation in the compression efficiencies for all recompression candidates is obtained. μ1 and μ2 are weights, and may be set either in advance or by the user. In the latter case, the user can set a larger μ2 and smaller μ1, for example, when it is desired to suppress deterioration of image quality rather than curtailing the time taken to complete the process.

The control section 11 finds a combination resulting in the minimum score a, and recompresses the recompression candidate indicated by the found combination with the compression efficiency also indicated by the found combination.

It should be noted that the control section 11 may select a recompression candidate while referring to history information on past compression processing, for example. In this case, it is determined that the control section 11 receives an instruction from the user concerning specification of a recompression candidate and setting of the compression efficiency for recompression, and carries out recompression processing according to the instruction. The content of the instruction is accumulated and stored in the storage section 12.

Specifically, the content of past instructions are accumulated for each of the genres of the motion image data which is recording object data (as for recording of a television program, classification of news, sport, variety, drama, and so forth). For example, for each genre, a statistic concerning the number of motion image data selected in the past as recording object data, the number of recording object data selected as a recompression candidate, the average amount of variations of the compression efficiency (for example, a difference in steps for compression efficiency), and so forth, is stored in the storage section 12.

Then, during selection of a recompression candidate, the control section 11 refers to the statistic to select recording object data of the largest data size in the respective genres, sequentially beginning with the genre with a higher rate of selection in the past as a recompression candidate. Also, compression efficiency for use in recompression is determined based on the average amount of variation in the compression efficiency.

As described above, in this embodiment, the user need not make a setting for recompression, and accordingly, convenience relevant to data size adjustment can be enhanced.

The invention claimed is:

1. A data recording device for recording a plurality of recording object data on a recording medium having a storage area of a predetermined capacity, comprising:
   an estimated volume calculation portion for calculating an estimated value of the total volume of the plurality of recording object data, which results when the plurality of recording object data is recorded on the recording medium;
   a recompression candidate selection portion for selecting, when the estimated value calculated is in excess of the predetermined capacity, at least one of the plurality of recording object data as a recompression candidate; and
   a recompression portion for changing the compression method for the recording object data selected as the recompression candidate and for compressing the recording object data selected, using a method with higher compression efficiency,
   wherein
   the recompression candidate selection portion lists more than one available combination in selection of a recompression candidate from the plurality of recording object data, calculates an estimated value of the total volume after recompression for each of the combinations, and calculates, for at least a part of the combinations resulting in the estimated value of the total volume after recompression being smaller than the predetermined capacity, a score associated with at least one of a number of recording object data selected as recompression candidates and the amount of variation in the compression efficiency, and selects a recompression candidate based on the score.

2. A data recording device according to claim 1, wherein the recording object data is motion image data.

3. A data recording device for recording a plurality of recording object data on a recording medium having a storage area of a predetermined capacity, comprising:
   an estimated volume calculation portion for calculating an estimated value of the total volume of the plurality of recording object data, which results when the plurality of recording object data is recorded on the recording medium;
   a recompression candidate selection portion for selecting, when the estimated value calculated is in excess of the predetermined capacity, at least one of the plurality of recording object data as a recompression candidate; and
   a recompression portion for changing the compression method for the recording object data selected as the recompression candidate and for compressing the recording object data selected, using a method with higher compression efficiency,
   wherein
   the recompression candidate selection portion calculates an estimated value of the total volume after recompression for each combination available in selection of a recompression candidate from the plurality of recording object data, and calculates, for at least a part of the combinations resulting in the estimated value of the total volume after recompression being smaller than the predetermined capacity, a score based on a number of recording object data selected as recompression candidates and the amount of variation in the compression efficiency, and selects a recompression candidate based on the score.

4. A data recording device according to claim 3, wherein the score is calculated as $$\sigma = \mu 1 \times N + \mu 2 \times \Sigma Di$$

with N being the number of recording object data selected as recompression candidates, $\Sigma Di$ being the sum of the amount of variation in the compression efficiencies for all recompression candidates, and $\mu 1$, $\mu 2$ being weights.

5. A data recording device for recording a plurality of recording object data on a recording medium having a storage area of a predetermined capacity, comprising:
   an estimated volume calculation portion for calculating an estimated value of the total volume of the plurality of recording object data, which results when the plurality of recording object data is recorded on the recording medium;
   a recompression candidate selection portion for selecting, when the estimated value calculated is in excess of the predetermined capacity, at least one of the plurality of recording object data as a recompression candidate; and
   a recompression portion for changing the compression method for the recording object data selected as the recompression candidate and for compressing the recording object data selected using a method with higher compression efficiency, and
   a portion for storing at least a part of a history of compression processing carried out by a user, the history comprising a statistic for each genre of recording object data selected in a past compression processing,
   wherein
   the recompression candidate selection portion selects a recompression candidate based on the statistics.

6. A data recording device according to claim 5, wherein the portion for storing at least a part of the history of compression processing carried out by a user stores the history of the number of recording object data selected as recompression candidates as the statistic for each genre of the recording object data, and the recompression candidate selection portion selects, while referring to the statistics, recording object data as a recompression candidate, sequentially beginning with the genre with a higher rate of selection in the past as a recompression candidate, based on at least one of data size and average of the amount of variation in the compression efficiencies in the past.

7. A data recording method for recording a plurality of recording object data on a recording medium having a storage area of a predetermined capacity, using a computer, the method comprising:
- calculating an estimated value of the total volume of the plurality of recording object data, which results when the plurality of recording object data is recorded on the recording medium;
- selecting, when the estimated value calculated is in excess of the predetermined capacity, at least one of the plurality of recording object data as a recompression candidate;
- storing at least a part of a history of compression processing carried out by a user;
- selecting a recompression candidate while referring to the history stored, the history comprising a statistic for each genre of recording object data selected in a past compression processing;
- changing the compression method for the recording object data selected as the recompression candidate;
- compressing the recording object data selected, using a method with higher compression efficiency; and
- selecting a recompression candidate based on the statistics.

8. A computer readable recording medium storing a program for recording a plurality of recording object data onto a recording medium having a storage area of a predetermined capacity, and causing a computer to execute,
- a procedure for calculating an estimated value of the total volume of the plurality of recording object data, which results when the recording object data is recorded on the recording medium;
- a procedure for selecting, when the calculated estimated value is in excess of the predetermined capacity, at least one of the plurality of recording object data as a recompression candidate;
- a procedure for storing at least a part of a history of compression processing carried out by a user; and
- a procedure for selecting a recompression candidate while referring to the history stored, the history comprising a statistic for each genre of recording object data selected in a past compression processing, changing the compression method for the recording object data selected as the recompression candidate, compressing the recording object data selected, using a method with higher compression efficiency, and selecting a recompression candidate based on the statistics.

* * * * *